UNITED STATES PATENT OFFICE.

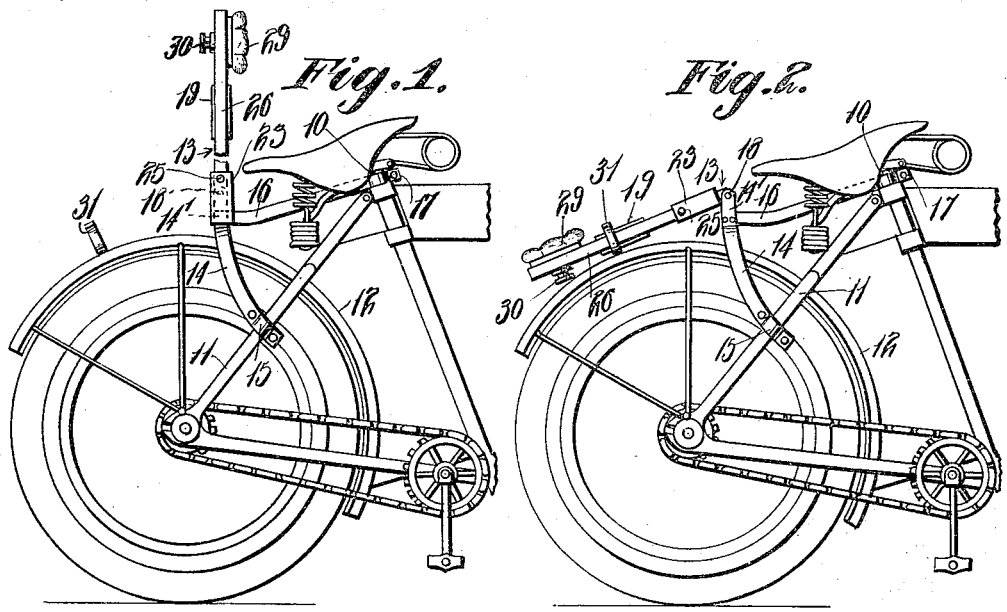

JAMES P. JOHNSON, OF COUNCIL BLUFFS, IOWA.

BACK-REST FOR MOTOR-CYCLES.

1,139,184.     Specification of Letters Patent.     Patented May 11, 1915.

Application filed May 7, 1913. Serial No. 765,989.

*To all whom it may concern:*

Be it known that I, JAMES P. JOHNSON, a citizen of the United States, residing at Council Bluffs, in the county of Pottawattamie, State of Iowa, have invented certain new and useful Improvements in Back-Rests for Motor-Cycles; and I do hereby declare the following to be a full, clear, and exact description of the invention such as will enable others skilled in the art to which it appertains to make and use the same.

This invention relates to back rests, and it more particularly relates to an improved attachment for bicycles, motorcycles, etc., for the purpose of supporting the back of the rider.

An object of the invention is to provide an improved back rest of this character which may be easily and quickly attached to a bicycle or motorcycle of ordinary construction.

Another object is to provide a device of this character which is simple of construction, relatively inexpensive, strong, durable, and thoroughly efficient.

Another object is to provide a device of this character which may quickly and easily be swung out of its operative position, or folded, and securely held in its inoperative position.

Other objects and advantages may be recited hereinafter and in the claim.

In the accompanying drawings, which supplement this specification: Figure 1 is a side elevation view of a portion of a bicycle having my improved back rest attachment secured thereon, in its operative position. Fig. 2 is a somewhat similar view, in which the back rest is in its folded position. Fig. 3 is a rear elevation view. Fig. 4 is a top plan view. Fig. 5 is a vertical sectional view through the hinge and upper portion of the attachment, and Fig. 6 is a perspective view of the slidable sleeve or lock member.

Referring to these drawings, in which similar reference characters correspond with similar parts throughout the several views: The bicycle wheel and frame section is only shown for the purpose of illustrating the application of my invention, and will not be described in detail. In the following description, and in the claims, the term "bicycle" is to be construed as including tricycles, motorcycles, unicycles, etc.

The bicycle is provided with the usual seat post 10, rear forks 11 and mud-guard 12. The back rest attachment consists of a bifurcated hinge-jointed member 13, the furcations 14 of which are provided with clamps 15 adapted to engage with the rear forks 11 of the bicycle. A horizontal bar or brace 16 is rigidly secured to the plate or yoke 14′ adjacent to or at the junction of the furcations 14, and the forward end of this bar 16 is provided with a suitable clamp 17 adapted for engagement with the seat post of the bicycle. A short distance above the junction of the elements 14 and 16 is the hinge-joint 18, and above this hinge-joint is a spring seat 19 in which a spring 20 has its upper end seated, while a rod 21 is in engagement with the lower end of said spring and has its lower end in engagement with a pin 22 which forms an element of the slidable sleeve or lock member 23. This lock member is provided with a slot 24 which fits over the contiguous end of the bar 16, and it is also provided with a stud or handle 25 by means of which the sleeve may be raised above the hinge-joint. The standard or upper section 26 of the hinge-jointed member 13 is slotted at 27 for the reception of an extension or lug 28 of the back-supporting member 29; this lug being apertured and screw-threaded for the reception of a screw or bolt 30. The length of the slot 27 is greater than that of the lug 28, so that the latter may be slid up or down in said slot, and when the proper position of adjustment has been obtained, the screw 30 may be tightened for holding the back rest in its properly adjusted position. This adjustable back 29 is suitably curved, so as to conform to the shape of a person's back, and may be cushioned or upholstered in any suitable way, so as to render it perfectly comfortable.

Upon the guard 12 is secured a spring clamp or crotch 31, in proper position to receive and hold the member 26 when in its inoperative position.

In operation, as the rider is pedaling his bicycle, the back rest may or may not be used, as preferred; but when the rider is coasting or when riding a motorcycle he sits in an upright position, and his back rests against the back rest. However, when riding over very rough roads or streets, so that his back would jostle uncomfortably against the back rest, he may grasp the handle 25 and raise the sleeve 23 above the hinge-joint, so that the member 26 may be swung back until it engages with the crotch or keeper 31.

When the member 26 is raised into its operative position, the spring 20 assists gravity in pushing the sleeve 23 over the hinge-joint, so as to effectually and rigidly lock the upper and lower sections of the member 13 in alinement.

It will be seen that I have provided a back rest of this character which is fully capable of attaining the desired objects in a thoroughly practical and efficient manner.

I do not limit my invention to the exact details of construction, combination and arrangement of parts, as herewith illustrated and described, but my invention may only be limited by a reasonable interpretation of the claim.

I claim:

A back rest comprising a standard adapted to be secured to the frame of a bicycle, and including upper and lower hingedly connected sections, said upper section being provided with a slot, a sleeve slidably mounted on the standard and adapted to lock the hinge joint thereof when said sections are in alinement, a pin carried by the sleeve and extending through the slot, an expansion spring mounted in said slot and connected to the pin to normally urge the sleeve to locking position, and means for moving said sleeve out of locking relation with the hinge.

In testimony whereof, I affix my signature, in the presence of two witnesses.

JAMES P. JOHNSON.

Witnesses:
 FAY SMITH,
 IRENE SLACK.

Copies of this patent may be obtained for five cents each, by addressing the "Commissioner of Patents, Washington, D. C."